(12) United States Patent
Beneway

(10) Patent No.: US 6,533,128 B1
(45) Date of Patent: Mar. 18, 2003

(54) HOLDER FOR STORAGE BOXES

(76) Inventor: James M. Beneway, 7 Darien Rd., Lake Carmel, NY (US) 10552

( * ) Notice: Subject to any disclaimer, the term of this patent is extended or adjusted under 35 U.S.C. 154(b) by 0 days.

(21) Appl. No.: 10/066,186

(22) Filed: Feb. 4, 2002

(51) Int. Cl.[7] .............................................. A47G 29/00
(52) U.S. Cl. ........................ 211/40; 211/40; 211/41.1; 211/71.1; 211/85.17; 211/87.1; 211/88.1; 211/89.1; 206/308.1; 312/9.11; 312/9.16; 312/9.17
(58) Field of Search ................................ 211/40, 89.01, 211/71.01, 87.01, 88.01, 85.17, 41.1; 206/308.1; 312/9.11, 9.16, 9.17

(56) References Cited

U.S. PATENT DOCUMENTS

| | | | |
|---|---|---|---|
| 4,087,138 A | * | 5/1978 | McRae |
| 4,330,162 A | * | 5/1982 | Aboussouan |
| 4,497,125 A | | 2/1985 | Hutchinson |
| 4,630,737 A | * | 12/1986 | King ............................ 211/40 |
| 4,651,882 A | * | 3/1987 | Wright et al. ................. 211/40 |
| 4,673,152 A | | 6/1987 | Brown |
| 4,811,851 A | | 3/1989 | Shane |
| 4,900,107 A | | 2/1990 | Long |
| 4,919,287 A | | 4/1990 | Haskett |
| 4,928,818 A | | 5/1990 | Friess |
| 4,940,147 A | | 7/1990 | Hunt |
| 4,951,826 A | | 8/1990 | Tompkins |
| 4,971,206 A | | 11/1990 | Lemmerman |
| 5,027,955 A | | 7/1991 | Shoemaker |
| 5,040,687 A | | 8/1991 | Whittington |
| 5,078,270 A | | 1/1992 | Campbell |
| 5,088,674 A | * | 2/1992 | Prince ...................... 248/311.2 |
| 5,105,952 A | | 4/1992 | Krattiger |
| 5,172,817 A | | 12/1992 | Gross |
| 5,232,089 A | | 8/1993 | Kim |
| 5,333,741 A | | 8/1994 | Yang |
| 5,341,942 A | | 8/1994 | James, Jr. |
| 5,351,835 A | | 10/1994 | Hallgren |
| 5,372,263 A | | 12/1994 | Niekel |
| 5,385,398 A | | 1/1995 | Huys |
| 5,402,896 A | | 4/1995 | Gould et al. |
| 5,462,177 A | | 10/1995 | O'Donnel |
| 5,485,926 A | | 1/1996 | Kundert |
| 5,497,889 A | | 3/1996 | Genovesi |
| 5,515,967 A | | 5/1996 | Fitzsimmons |
| 5,518,125 A | | 5/1996 | Colosimo |
| 5,533,614 A | | 7/1996 | Walker |
| 5,542,531 A | | 8/1996 | Yeung |
| 5,553,720 A | | 9/1996 | Dardashti |
| 5,570,791 A | | 11/1996 | Sommi |
| 5,593,032 A | | 1/1997 | Staley |
| 5,603,415 A | | 2/1997 | Balnis |
| 5,622,270 A | * | 4/1997 | Bezos ......................... 211/40 |
| 5,628,414 A | | 5/1997 | Heathcote |
| 6,196,510 B1 | * | 3/2001 | Legaspi ....................... 211/40 |

\* cited by examiner

*Primary Examiner*—Robert W. Gibson, Jr.
(74) *Attorney, Agent, or Firm*—Lilling & Lilling P.C.

(57) ABSTRACT

The CD box holder comprises a substantially flat base plate. A shelf is formed at the bottom to vertically support the CD box. At the top a push panel in combination with a locking panel are rotatably mounted. To utilize the Invention, the bottom edge of the CD box is inserted on the shelf and the top is pushed into the holder until it is held securely in place by the locking panel. To remove the CD box, the locking panel is rotated up and the push panel pushes the CD box out from the holder.

7 Claims, 2 Drawing Sheets

HOLDER FOR STORAGE BOXES

FIELD OF THE INVENTION

The invention relates to the compact disc industry and, more particularly, to a device for holding the boxes for compact discs on a wall, or other flat surface.

BACKGROUND OF THE INVENTION

One of the most ubiquitous medium for conveying information is the compact disc (hereinafter CD). Initially used primarily for distribution of music, compact discs are now used for distributing all types of information in many different formats. Not only are they used for music, but also for video recordings and, perhaps most importantly, computer data files.

Universally used for protection of the compact discs are "jewel boxes." These plastic CD boxes are relatively flat and thin and are of a standard size. Due to the large number of compact discs in use, for a myriad of purposes, people require some type of holder to support these jewel boxes, and the compact discs in them, so they can be quickly found and used.

Niekel (U.S. Pat. No. 5,372,263) discloses a modular display rack for CD-boxes. A problem with this device is that it is a rack and is useful only when many CD-boxes are to be displayed. If only one CD-box needs to be hung, this device is not suitable. Moreover, the display rack is useful only for display, and is a hindrance when someone wants to actually use one of the displayed CDs. As shown, the CD-box 11 is held between T-shaped profiled guides 4 and 5. Each set of guides holds a plurality of CD boxes. If the CD in the middle is wanted, then the end CDs must also be removed. Besides, it is a big unit, which is not desirable if only one or two CD boxes need to be supported.

Another CD storage and display rack is shown by O'Donnell (U.S. Pat. No. 5,462,177). This too is designed for storing a collection of CD boxes, and is not designed for hanging only a single CD box. In order to release a particular CD box, the user must insert his finger into semicircular cavities 32 and 34 to pull the CD box up from the rack. For elderly people and also children, this may be difficult to accomplish.

Fitzsimmons (U.S. Pat. No. 5,515,967) discloses a plastic package for storing and selling CDs at retail, but it is not designed for holding the actual CD boxes on a wall. Yeung (U.S. Pat. No 5,542,531) is concerned with the specific structure for the CD box itself, and does not disclose any holder for the CD boxes.

Dardashti (U.S. Pat. No. 5,553,720) provides a vertical rack for holding not only CD boxes, but also cassettes, tapes, game cartridges and similar devices. It can be free standing or wall mounted. It is designed, however, to hold many CD boxes, and is again not designed to hold just one or two CD boxes.

Therefore, there is a need for a simple holder that may be mounted on a wall for holding just a single CD box. No such device is known in the prior art. While racks and display units to hold dozens or hundreds of CD boxes are well known and utilized, there are no known holders for the situation where a person needs to mount just a single CD box on the wall for display or storage purposes.

SUMMARY OF THE INVENTION

Therefore, it is an object of the invention to provide a simple holder which can be mounted on the wall and which can be used for storing just a single CD box.

This and other objects are accomplished by a simple CD box holder, that comprises a substantially flat base plate. A shelf is formed at the bottom to vertically support the CD box. At the top a push panel in combination with a locking panel are rotatably mounted.

To utilize the Invention, the bottom edge of the CD box is inserted on the shelf and the top is pushed in until it is held securely in place by the locking panel. To remove the CD box, the locking panel is rotated up and the push panel pushes the CD box out from the holder.

Self adhesive strips or screws are used to attach the holder to the wall.

DETAILED DESCRIPTION OF THE INVENTION

Figure 1:
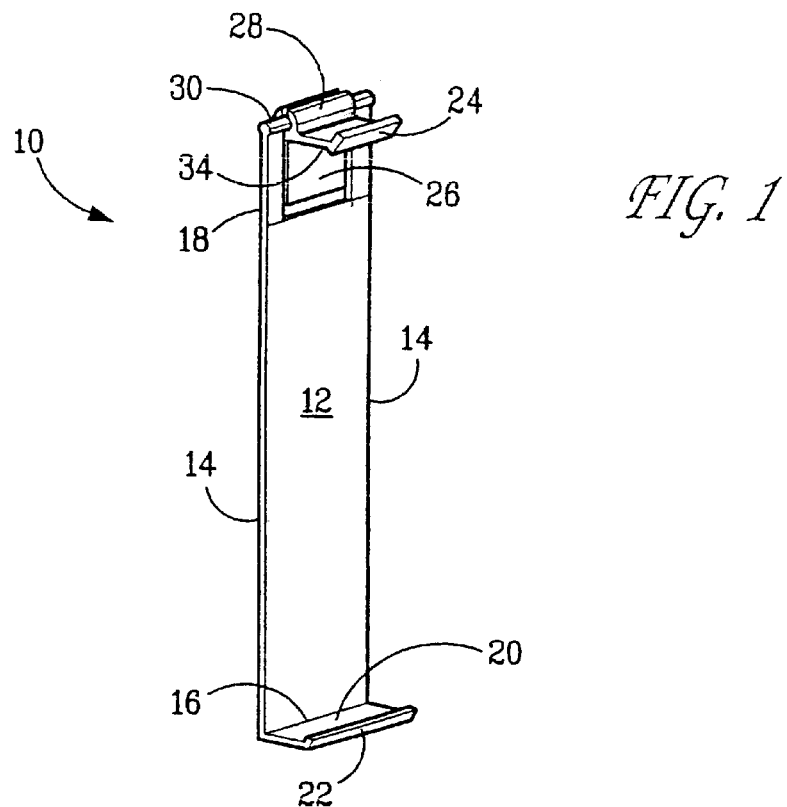
FIG. 1 is a perspective view of the Holder for CD storage boxes.
Figure 2:
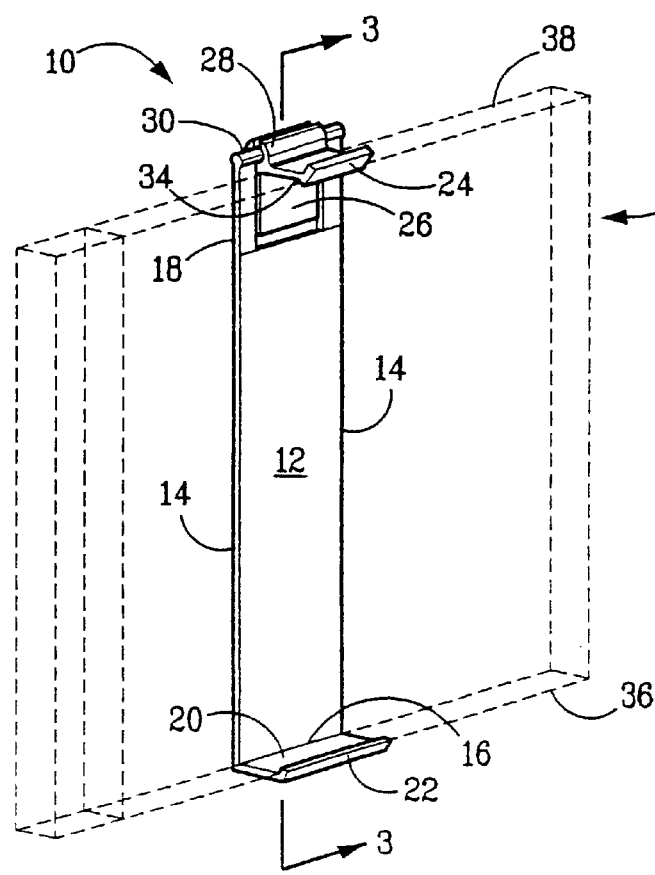
FIG. 2 is a perspective view similar to FIG. 1, but showing a CD box in the Holder.
Figure 3:
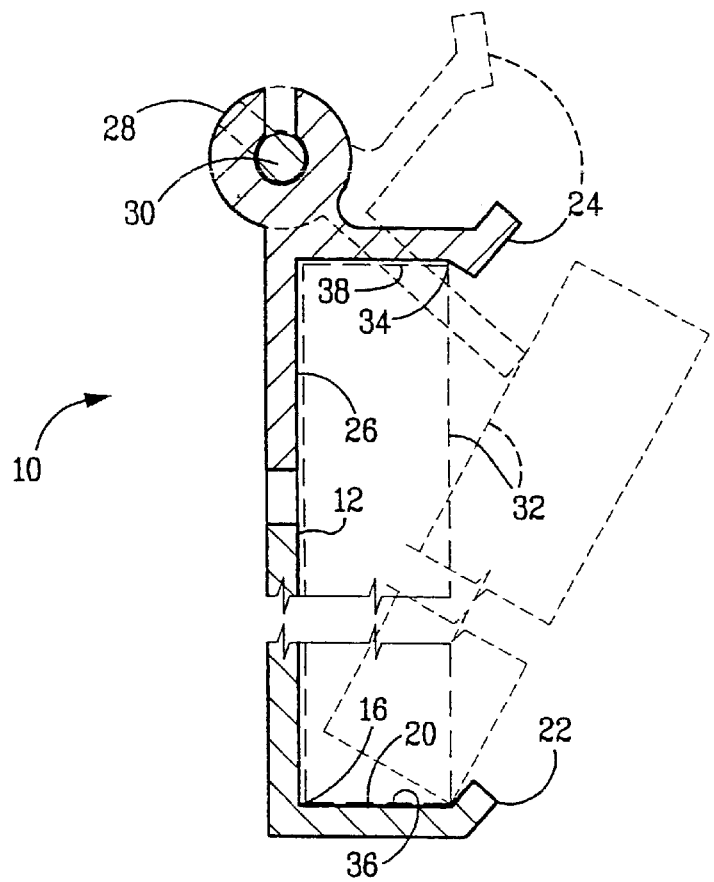
FIG. 3 is a cross sectional view taken along line 3—3 of FIG. 2.
Figure 4:
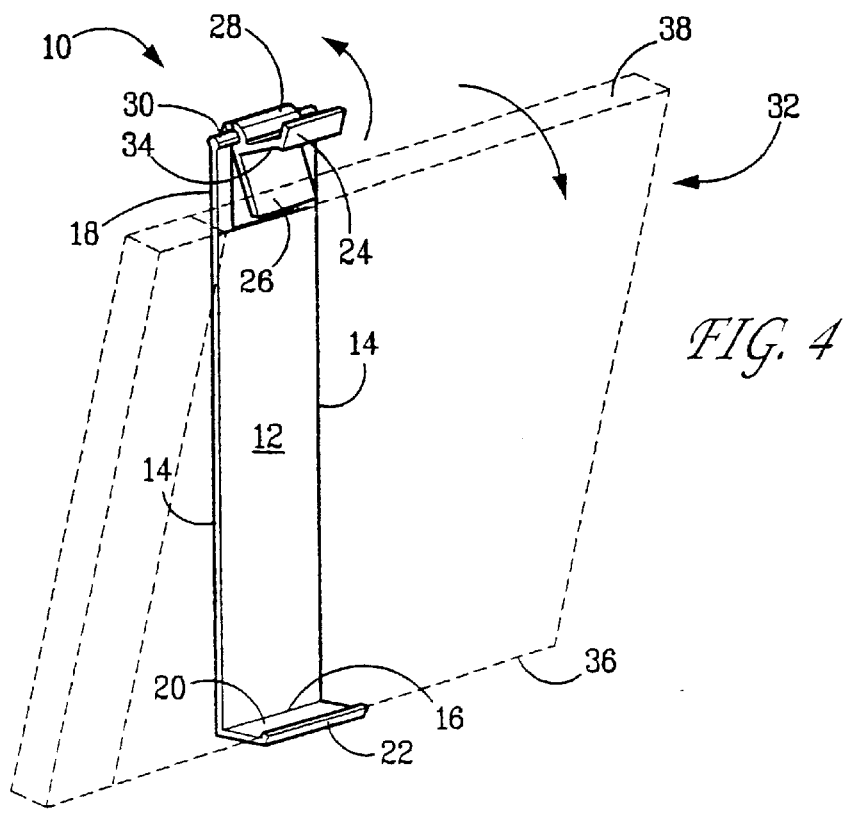
FIG. 4 is a perspective view similar to FIG. 2, but showing removal of the CD box.

The Holder 10 of this invention may be made of any suitable material, such as plastic, acrylic, metal or wood, but is made of plastic in the preferred embodiment. Though the Holder will be described herein as being of several components, it should preferably be made as a single unitary device.

A base plate 12 forms the basic support structure of the Holder 10. Typically, the base plate will be of a rectangular configuration with parallel sides 14, a bottom edge 16 and a top portion 18. It may be appreciated that any other suitably shaped configuration may be used, such as square, triangle, circular and other common geometric shapes.

Preferably, the base 12 is flat and relatively thin, so it can be nearly flush mounted on the wall or other support structure. In the preferred embodiment it may be about one-sixteenth of an inch (1/16") thick. Any width for the base 12 is generally acceptable, as long as it is wide enough to support the CD box steadily without wobbling. It is not necessary for the base to be as wide as the CD box itself, but bases that are too narrow may not have enough surface area to properly hold the CD box without wobbling.

At the bottom edge 16 of the base, it is bent at approximately a right angle to define a support shelf 20. In some embodiments, a lip 22 may be utilized at the end of the shelf 20. The depth of the shelf should approximate the thickness of a standard CD box, and is preferably about three-eights of an inch (1/8").

Made as an integral unit are a locking plate 24 and a push plate 26. They are joined together at an acute angle by a rounded base 28. At the top of the lease, a rounded shaft 30 is defined and the base 28 rotatably fits over the shaft. By this means, the locking plate and push plate are free to pivot or rotate about the top portion of the base. There may be an opening in the top portion of the base for placement of the push plate when the compact disc is mounted on the Holder.

In an alternate embodiment the rounded base defines a two part shaft with a break in the middle. At the top of the base 12, the topmost portion is turned over itself to define a hollow shaft. To facilitate assembly, the lock plate 24, push plate 26 and base 28 are open in the middle to define a connection zone in which the hollow shaft of the topmost portion 40 of the base can be positioned. In order to construct the unit, the components are laid in position on each other with the hollow shaft fitting between the two separate sections of the shaft of the base. Then, a pin is slid into one end of the base, pushed through the shaft and then through the remaining portion of the base. In this way, the locking plate and push plate are free to rotate about the top of the base. It is also possible to reverse the structure and have a partial shaft with the pin on the top portion of the base and the interior hollow shaft on the unit with the locking plate and push plate.

Further, it may be appreciated that any other construction may be used to rotatably mount these elements. A standard hinge could be used or simple pivots. The key point is that the combination of the locking plate and push plate need to be able to rotate about the top of the base of the unit.

Any suitable means can be used to secure the Holder onto a wall or other flat, support surface. Adhesives may be used or two sided tape. Mating Velcro® strips can also be used. If desired, holes may be placed in the base, and screws can be used to hold the unit.

By this means the Holder can be positioned literally anywhere, on a wall, a bookcase, furniture, appliances, a computer—anyplace. Creative people can strategically place the holders, so as to provide creative decoration, depending on the particular CD box that is utilized. Many of the CD boxes now have very artistic designs and graphics on the labels and the boxes themselves. Therefore, by appropriate placement of the Holders, the designs on the CD boxes can be displayed in creative manners, as teenage people typically do with wall posters. This too provides an additional benefit of the Holder.

To use the Holder, it is mounted at the desired location. Thereafter, the bottom edge 36 of the CD box 32 is placed on the shelf 20 of the Holder and the top 38 of the CD box is pushed inward until it "locks" in position under and against the locking plate 24. During this operation, the locking plate will actually lift a little bit and then the top of the CD box 32 will snap into position under it. The lip 22 is used to prevent the CD box from slipping out of the Holder.

In its normal position, the locking plate 24 is not quite at a right angle and is a few degrees off the perpendicular plane to the top of the base. It may also have a small groove 34 on its surface. By this means when the CD box is pushed into position, the top 38 of the CD box fits into the grove 34 and is held securely, so it can not accidentally dislodge from the Holder.

To remove the CD box, the locking plate 34 is lifted up, the CD box disengages and the push plate 26 pushes it out from the Holder, so a person can grab and remove the CD box.

This simple to mount and to use Holder thereby allows a person to store a single CD box almost anywhere and to easily remove it for use.

The invention is described in detail with reference to a particular embodiment, but it should be understood that various other modifications can be effected and still be within the spirit and scope of the invention.

I claim:

1. A holder for one compact disc storage box, comprising a relatively flat base having a support shelf at its lower edge; means for mounting said base on a support surface; integrally made locking plate and push plate positioned at an acute angle to each other and rotatably mounted at a top portion of said base; whereby a compact disc storage box may be held in position on said shelf and a top edge of said compact disc storage box is secured under and against said locking plate, and rotation of said locking plate causes said top edge of said compact disc storage box to become disengaged from said locking plate and said push plate pushes the compact disc storage box out from said holder.

2. A holder according to claim 1, wherein said locking plate is normally positioned a few degrees off a perpendicular plane to said top portion of said base.

3. A holder according to claim 1, wherein said locking plate includes a groove for securing said top edge of said compact disc storage box.

4. A holder according to claim 1, wherein a pin is secured in a shaft positioned on said top portion of said base, and said locking plate and push plate are joined by a rounded base defining a hollow shaft and said pin is rotatably mounted in said hollow shaft.

5. A holder according to claim 1, wherein a shaft is defined on said top portion of said base, and said locking plate and push plate are joined by a rounded base that is rotatably mounted on said shaft.

6. A holder according to claim 1, wherein a hollow shaft is positioned on said top portion of said base, and said locking plate and push plate are joined by a rounded base that supports a pin and said pin is rotatably mounted in said hollow shaft.

7. A holder according to claim 1, wherein said support shelf extends outward at an approximate right angle from said base and has a lip to hold a compact disc storage box in position within said holder.

* * * * *